C. S. DAULER.
MOTOR CONTROL SYSTEM.
APPLICATION FILED JULY 24, 1913.
1,080,140.
Patented Dec. 2, 1913.
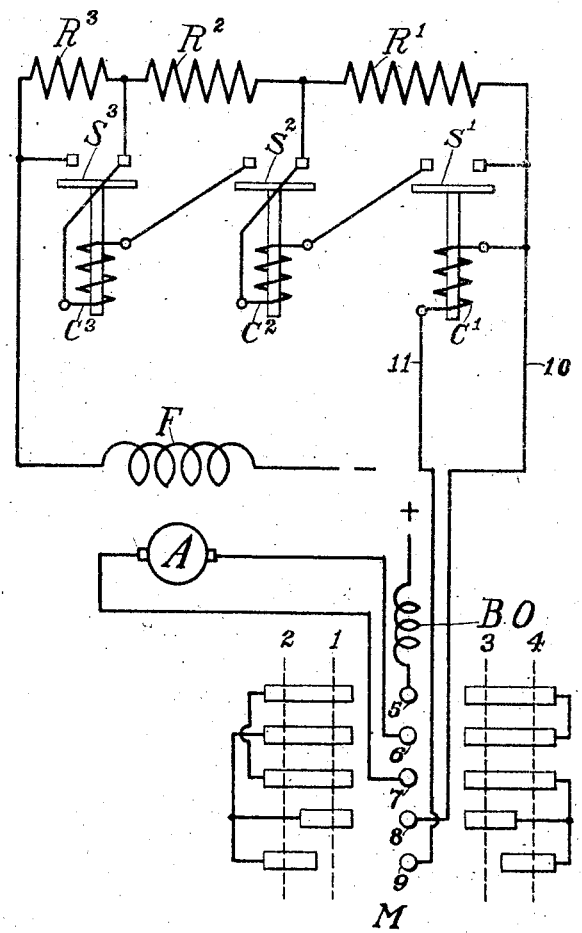

UNITED STATES PATENT OFFICE.

CYRUS S. DAULER, OF CLEVELAND, OHIO, ASSIGNOR TO THE ELECTRIC CONTROLLER AND MANUFACTURING COMPANY, OF CLEVELAND, OHIO, A CORPORATION OF OHIO.

MOTOR-CONTROL SYSTEM.

1,080,140.  Specification of Letters Patent.  Patented Dec. 2, 1913.

Application filed July 24, 1913. Serial No. 780,918.

*To all whom it may concern:*

Be it known that I, CYRUS S. DAULER, a citizen of the United States, residing at Cleveland, in the county of Cuyahoga and State of Ohio, have invented new and useful Improvements in Motor-Control Systems, of which the following is a specification.

My invention relates to motor control systems for electric motors, particularly that form in which the control of the motors is effected partially by means of a manually operated controller and partially by automatic means.

One of the objects of my invention is to automatically prevent an excess current flowing in the motor windings while the motor is being accelerated or reversed.

Another object is to prevent at the will of the operator the cutting out of all or part of the starting resistance while the motor is being started or reversed.

Other objects and advantages of my improved control system will be readily understood as hereinafter described.

The accompanying drawing is a diagrammatic representation of the control system embodying my invention.

Referring to the drawing, the motor is shown with the armature A and the field winding F. The resistances for the motor circuit are shown at $R'$, $R^2$, and $R^3$, and the switches for controlling the resistances are indicated at $S'$, $S^2$, and $S^3$. These switches have operating windings $C'$, $C^2$, and $C^3$, respectively, which are arranged to be connected in the motor circuit so that the switch windings are energized by current through the motor. I prefer to use for these switches the type of switch disclosed in Eastwood's Patent, No. 1,040,292, which remains open when the current in its winding is above a predetermined value, and operates to close its contacts when the current is reduced. The operator's switch is shown at M and is arranged to be moved either side of the central position for operating the motor in one direction or the other.

The operation of the system is as follows: When the operator's switch is moved to position 1, the motor circuit is closed as follows: from the positive through the blow-out coil BO of the operator's switch, the contact finger 5, the contacts of the controller to the contact finger 7, the armature A, the contact finger 6, the contacts of the controller to the contact finger 8, the wire 10, the resistances $R'$, $R^2$, and $R^3$, and the field winding F to the negative. All the starting resistance is connected in series with the motor and the motor will operate at its slowest speed. When the operator's switch is moved to position 2, the contact fingers 8 and 9 are first connected together closing a short circuit or by-pass around the winding $C'$ of the switch $S'$, and then this by-pass is opened at the contact finger 8. The motor circuit is now from the positive through the blow-out coil BO, the contact finger 5, the controller contacts to the contact finger 7, the motor armature A, the contact finger 6, the contacts of the controller to the contact finger 9, the wire 11, the operating winding $C'$, the resistances $R'$, $R^2$, and $R^3$, and the field winding F to the negative. The operating winding $C'$ of the switch $S'$ being now energized will close the switch $S'$ providing the current in the winding is below the value at which it is adjusted to operate. The switch $S'$ cuts out the resistance $R'$ and energizes the winding $C^2$ of the switch $S^2$. The switch $S^2$ will close when the current in the winding $C^2$ is reduced to the proper value and the switch $S^2$ in closing will cut out the resistance $R^2$ and energize the winding $C^3$ of the switch $S^3$. The switch $S^3$ will likewise be closed when the current in its winding is reduced to the proper value, thereby cutting out the resistance $R^3$ and connecting the motor directly across the line, leaving in circuit only the switch windings $C'$, $C^2$, and $C^3$. The motor will now operate at its normal speed. To reduce the speed of the motor, the operator can move the operator's switch back to position 1 whereupon the short-circuit or by-pass is closed around the winding $C'$, causing the winding to be deenergized and thereby causing the switch $S'$ to open. The switches $S^2$ and $S^3$ then open their contacts and the resistances $R'$, $R^2$, and $R^3$ are inserted in the motor circuit causing the motor to decrease its speed. To stop the motor the operator moves the operator's switch to the central position, thereby opening the motor circuit.

To operate the motor in the reverse direction the operator's switch is moved to positions 3 and 4. The operation of the control system will be the same as that described when the operator's switch is moved to positions 1 and 2, except that the current will be reversed in the motor armature A and remain in the same direction through the field winding F. The motor will, therefore, operate in the reverse direction and the operator can cause the resistances R', R², and R³ to remain in circuit or allow them to be cut out automatically by the switches S', S², and S³, as before described.

It will be obvious to those skilled in the art that numerous changes can be made in the apparatus without departing from the spirit of my invention.

I claim—

1. In a current-varying controller, a circuit, a resistance in the circuit, a switch for controlling the resistance, an operating winding therefor, an operator's switch for closing the circuit including the resistance and the switch winding therein, a by-pass around the winding, and means for opening the by-pass.

2. In an electric motor control system, a circuit therefor, a resistance in the circuit, a switch for cutting out the resistance, an operating winding for the switch energized by current through the motor, an operator's switch comprising contacts for connecting the motor in series with the resistance and the said switch winding, a by-pass around the winding, and means for opening the by-pass around the switch winding to energize the said winding.

3. In an electric motor control system, a motor, a circuit therefor, a resistance in the circuit, a switch for cutting out the resistance, an operating winding therefor, a by-pass for the said winding, and means for connecting the winding and the by-pass in the motor circuit and for opening and closing the said by-pass.

4. In an electric motor control system, a motor, a circuit therefor, a resistance in the circuit, a switch for cutting out the resistance, a winding therefor energized by current through the motor, a by-pass for the winding, and means for connecting the motor in series with the resistance and the said switch winding, and for opening and closing the by-pass.

5. In an electric motor control system, a motor, a circuit therefor, a resistance in the circuit, a series of switches for cutting out the resistance, operating windings therefor energized by current through the motor, a by-pass for the winding of the first switch of the series, and an operator's switch comprising contacts for closing the motor control circuit through the resistance and the by-pass, and contacts for opening the by-pass for energizing the winding of said first switch.

Signed at Cleveland, Ohio, this 19th day of July, A. D. 1913.

CYRUS S. DAULER.

Witnesses:
J. H. HALL,
H. M. DIEMER.